W. SHORE.
ROTARY COMPRESSOR.
APPLICATION FILED OCT. 24, 1912. RENEWED MAY 10, 1915.

1,153,874.

Patented Sept. 14, 1915.
5 SHEETS—SHEET 1.

WITNESSES:
H. L. Trimble.
A. G. Kelly.

INVENTOR:
William Shore,
by H. J. S. Dennison Atty.

W. SHORE
ROTARY COMPRESSOR.
APPLICATION FILED OCT. 24, 1912. RENEWED MAY 10, 1915.
1,153,874.
Patented Sept. 14, 1915.
5 SHEETS—SHEET 2.
Fig. 2.
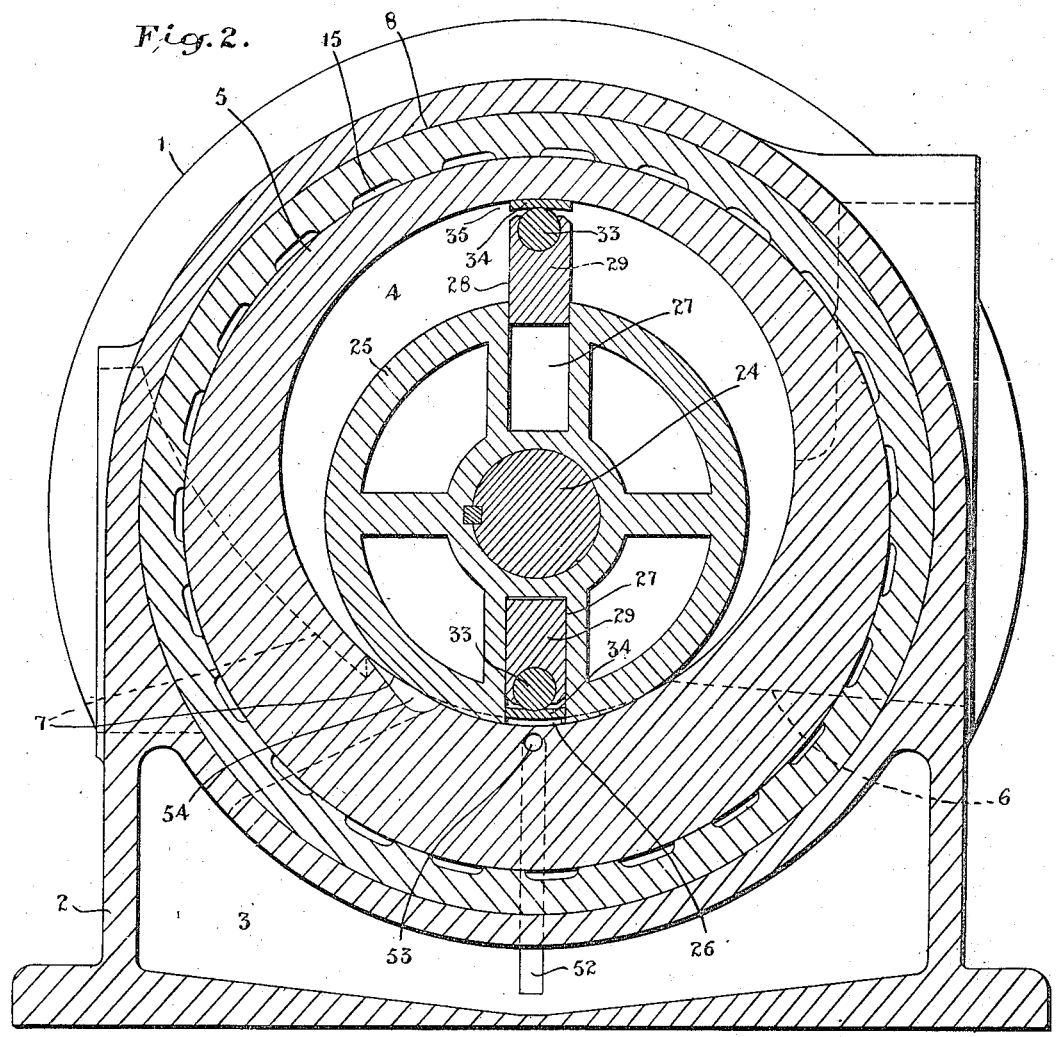
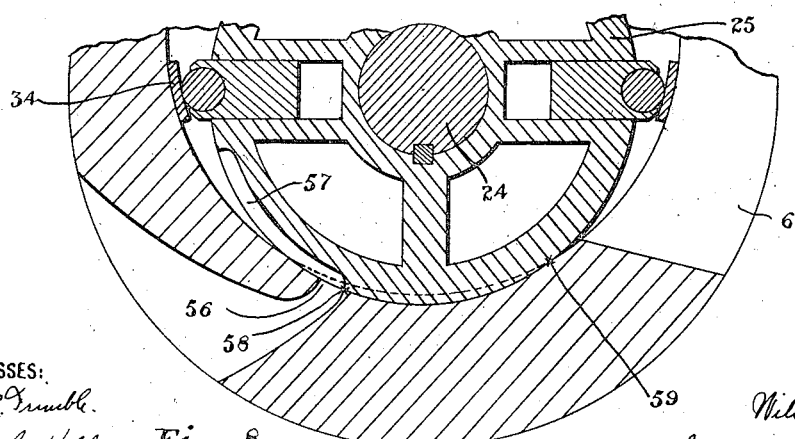
Fig. 8.
WITNESSES:
H. C. Trimble.
A. G. Kelly.
INVENTOR:
William Shore
by H. J. S. Dennison
Atty.

W. SHORE.
ROTARY COMPRESSOR.
APPLICATION FILED OCT. 24, 1912. RENEWED MAY 10, 1915.

1,153,874.

Patented Sept. 14, 1915.
5 SHEETS—SHEET 3.

WITNESSES:
H. L. Trimble.
A. G. Kelly.

INVENTOR:
William Shore
by H. J. S. Dennison
Atty.

W. SHORE.
ROTARY COMPRESSOR.
APPLICATION FILED OCT. 24, 1912. RENEWED MAY 10, 1915.

1,153,874.  Patented Sept. 14, 1915.
5 SHEETS—SHEET 4.

WITNESSES:
H. L. Trimble.
A. G. Kelly.

INVENTOR:
William Shore,
by H. J. S. Dennison
Atty.

W. SHORE.
ROTARY COMPRESSOR.
APPLICATION FILED OCT. 24, 1912. RENEWED MAY 10, 1915.

1,153,874.

Patented Sept. 14, 1915.
5 SHEETS—SHEET 5.

WITNESSES:
H. L. Trimble.
A. S. Kelly.

INVENTOR:
William Shore.
by H. J. L. Dennison
Atty.

UNITED STATES PATENT OFFICE.

WILLIAM SHORE, OF TORONTO, ONTARIO, CANADA, ASSIGNOR, BY DIRECT AND MESNE ASSIGNMENTS, TO THE FRANEY-SHORE COMPANY, OF WILMINGTON, DELAWARE, A CORPORATION OF DELAWARE.

ROTARY COMPRESSOR.

1,153,874.  Specification of Letters Patent.  Patented Sept. 14, 1915.

Application filed October 24, 1912, Serial No. 727,553. Renewed May 10, 1915. Serial No. 27,240.

*To all whom it may concern:*

Be it known that I, WILLIAM SHORE, a subject of the King of Great Britain, and resident of the city of Toronto, county of York, Province of Ontario, in the Dominion of Canada, have invented certain new and useful Improvements in Rotary Compressors, as described in the following specification and illustrated in the accompanying drawings, that form part of the same.

The essential features of this invention consist in the novel construction and arrangement of parts, whereby the rotating elements are effectively balanced and the contact shoes are held in fixed relation to the axis of the cylinder and whereby a thorough circulation of a sealing fluid is maintained.

The principal objects of the present invention are to devise a machine wherein the difficulties due to the friction and vibration of unbalanced parts are eliminated, to reduce wear to the minimum and to obviate leakage at the points of contact of the piston vanes.

A further object is to provide a circulation of lubricating fluid under pressure through the machine which effects the perfect lubrication of the parts and forms a hydraulic packing and also forms a hydraulic balance for the rotating parts.

Figure 1:
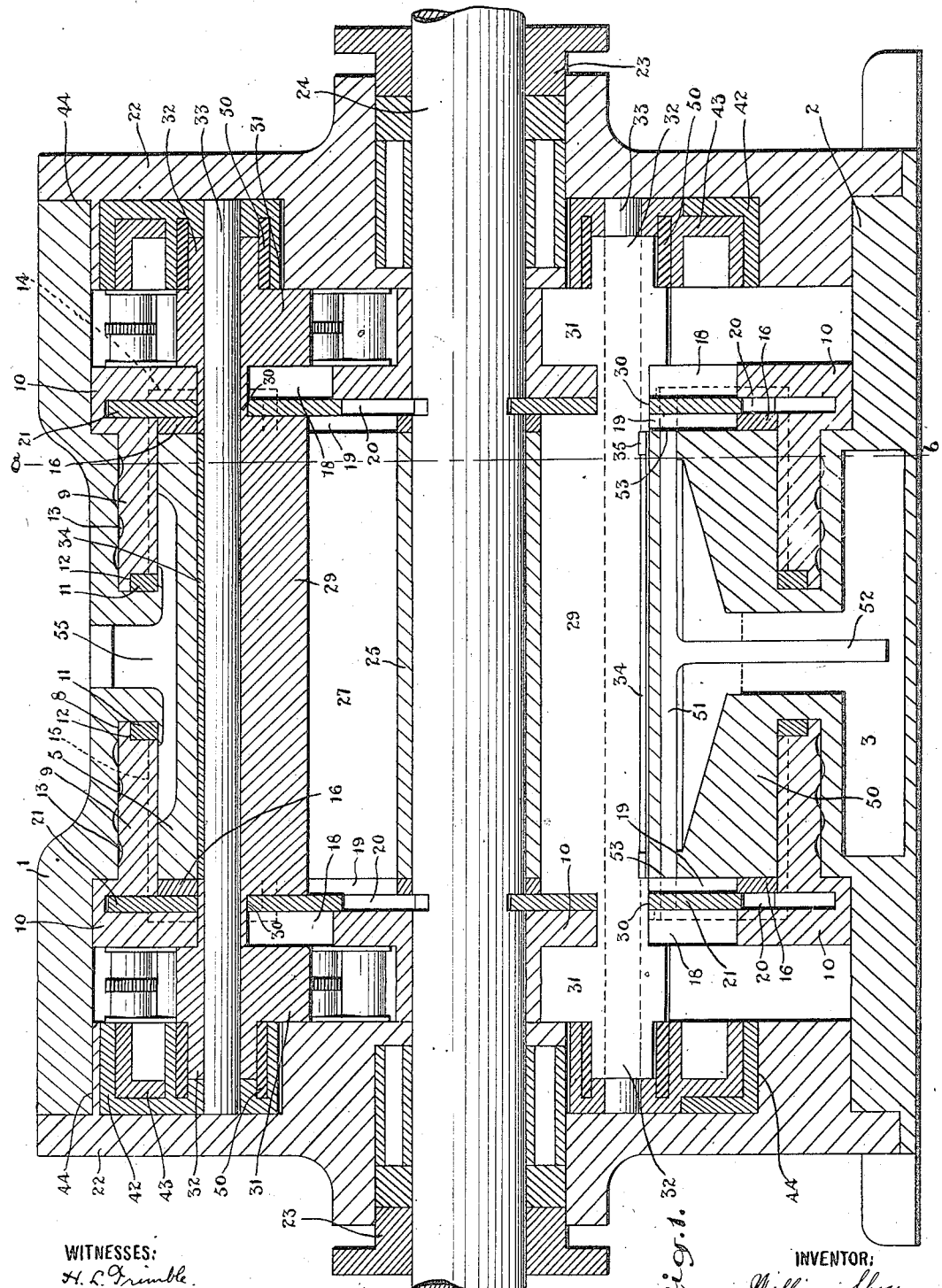
Figure 3:
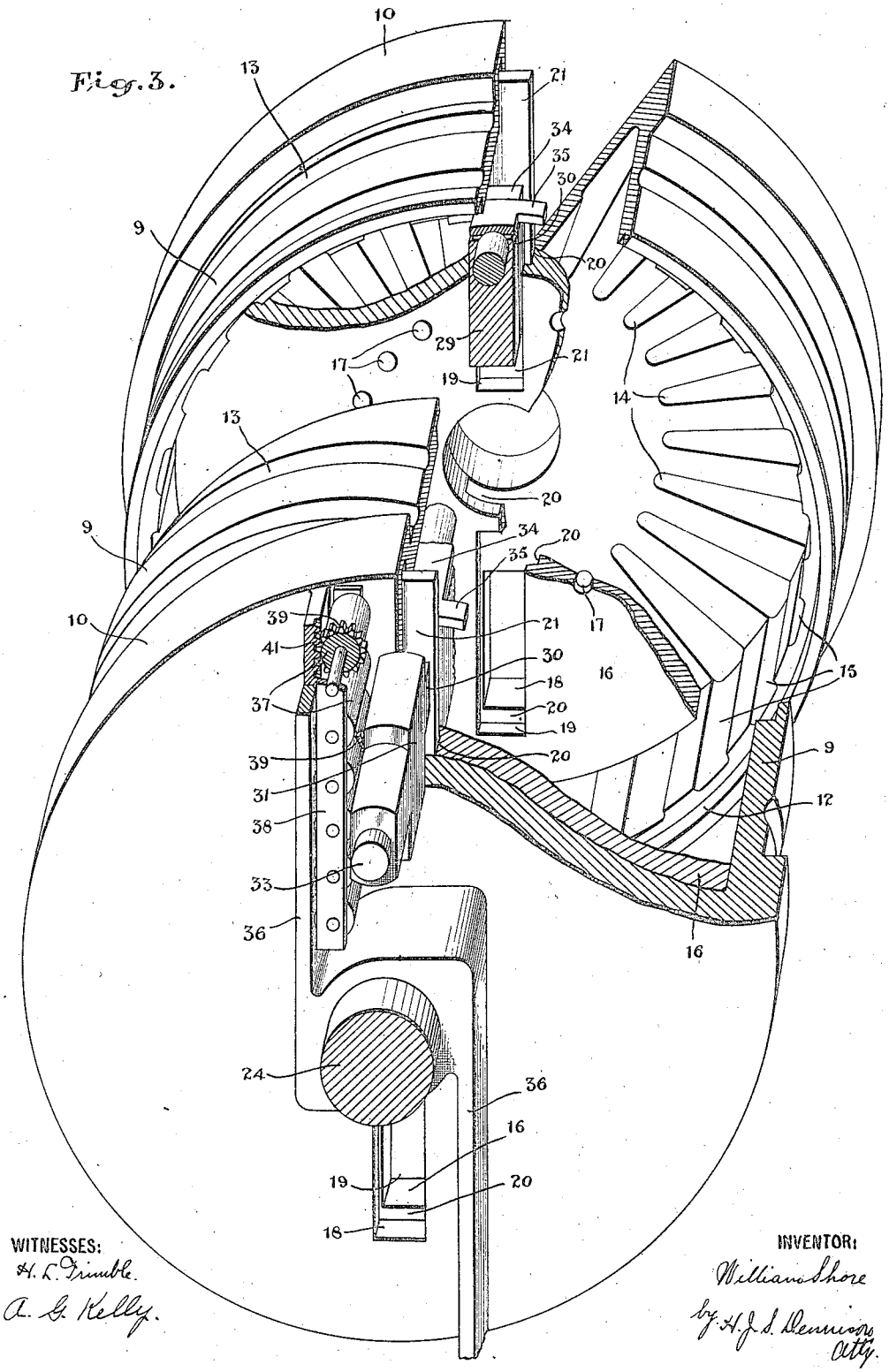
Figure 5:
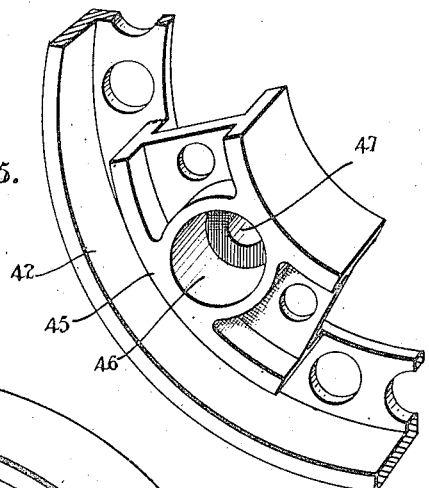
Figure 4:
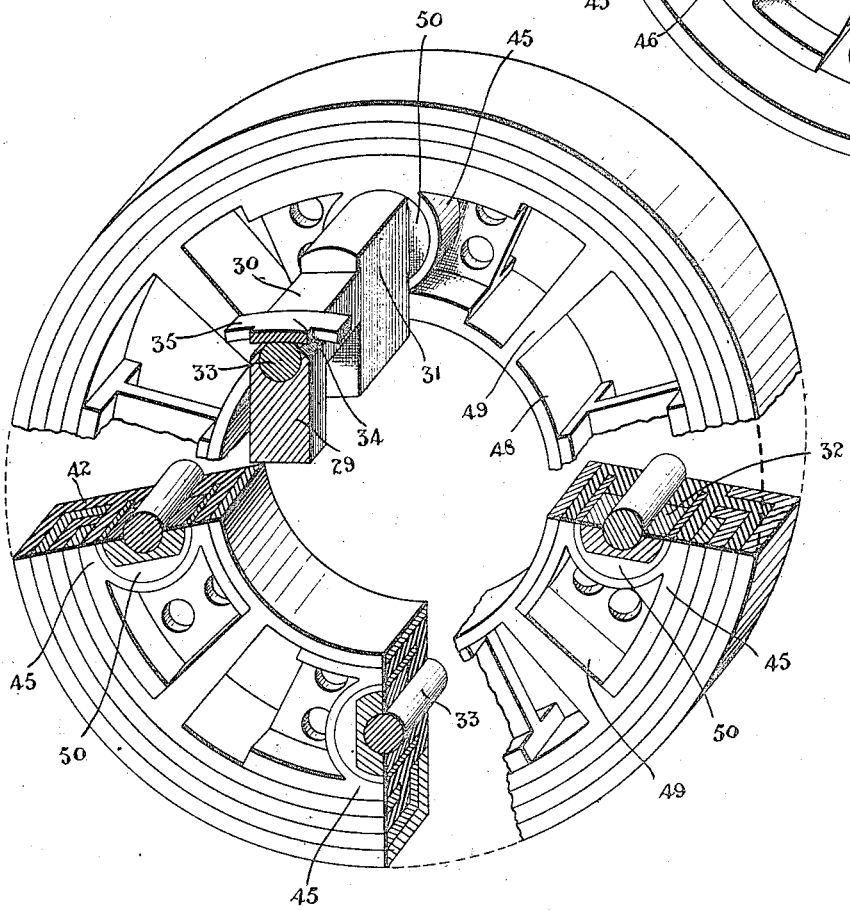
Figure 6:
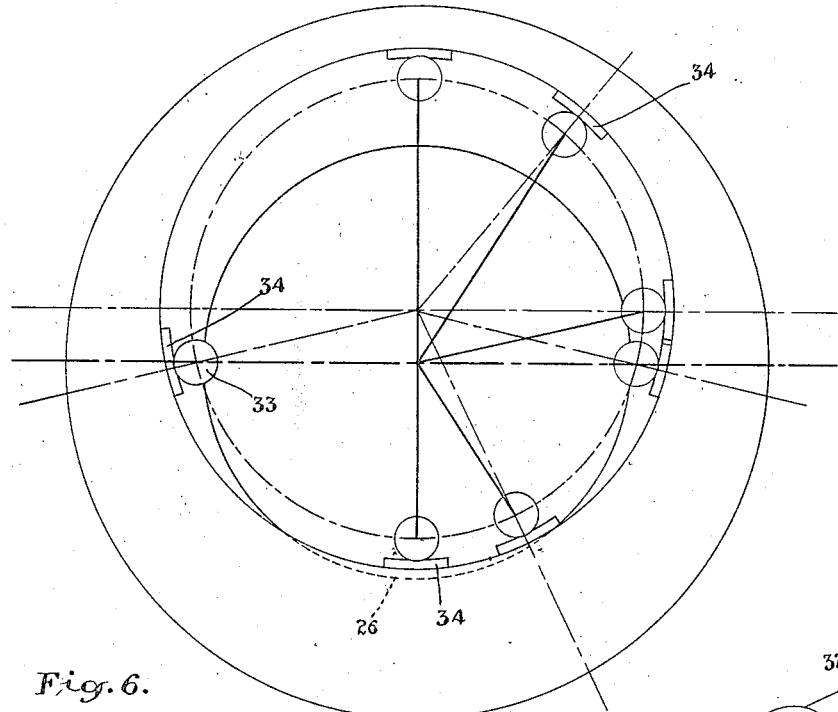
Figure 7:
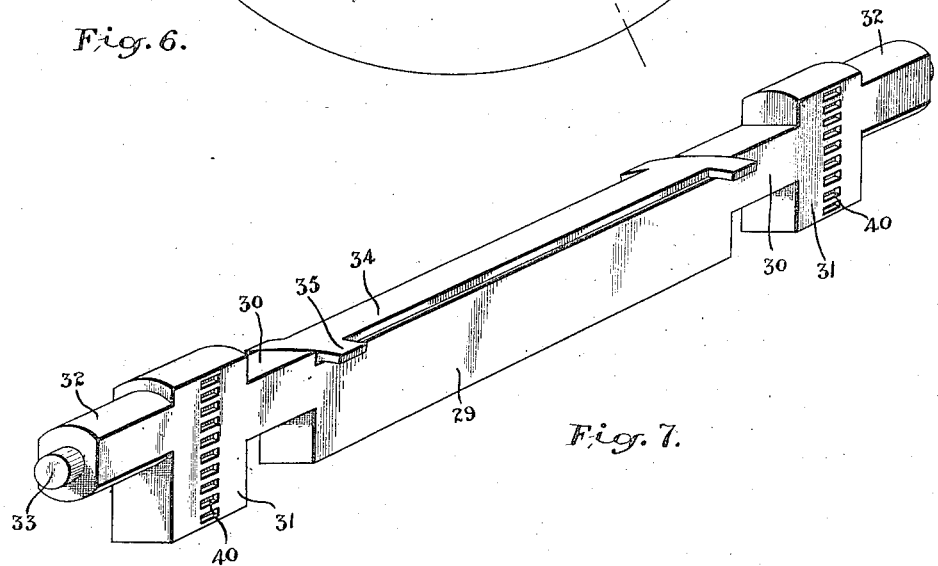

In the drawings, Figure 1 is a longitudinal vertical mid-section of a machine constructed in accordance with this invention. Fig. 2 is a vertical cross sectional view through the line *a—b* Fig. 1. Fig. 3 is a perspective view of the hydraulic packing and balancing sleeves shown partly broken away, one of the piston vanes being shown in position therein and broken away intermediate of its length. Fig. 4 is a perspective sectional view of a set of intercalated gyratory rings for supporting the piston vanes and vane contact shoes, a portion of one of said vanes being shown in position therein. Fig. 5 is a perspective detail of a portion of one of the rings shown in Fig. 4 illustrating the method of balancing the ring. Fig. 6 is a diagrammatic view illustrating the relative positions of the piston vane contact shoes and the vane axes in various positions in the cycle of rotation. Fig. 7 is a perspective view of one of the sliding piston vanes. Fig. 8 is a transverse sectional view of a portion of the machine showing a slight modification particularly adapted in compressors for high pressure work.

Like numerals of reference indicate corresponding parts in each figure.

Referring to the drawings, 1 is the outer casing of the machine which is substantially cylindrical in form and provided with a hollow base 2 containing an oil chamber 3.

4 is a cylindrical chamber formed within the portion 5 arranged centrally of the length of the casing 1, said chamber being eccentrically arranged in and extending longitudinally through said portion 5.

6 is the inlet port extending through one side of the central portion 5 and communicating with the cylinder chamber 4.

7 is the outlet port leading from the opposite side of the cylinder chamber 4 and opening through the side wall of the casing 1 and having communication with the oil chamber 3, said inlet and outlet ports being arranged centrally of the length of the said cylinder chamber 4.

8 are annular recesses formed in the central portion 5 and extending inwardly from the ends thereof and arranged concentric to the outer wall of the casing and eccentrically to the chamber 4.

9 are hydraulic packing sleeves adapted to fit into the annular recesses 8 having the circular heads 10 formed integral therewith and of slightly larger diameter than the sleeve portions, the heads 10 abutting the end faces of the central portion 5, and forming gyratory flanges.

11 are packing rings arranged in the annular grooves 12 in the inner ends of the sleeves 9 and 13 are spiral oil grooves formed in the outer periphery of the sleeves.

14 are a plurality of radially arranged recesses formed in the inner faces of the heads 10 and leading outwardly to and communicating with the longitudinally arranged hydraulic chambers 15 formed in the inner peripheral faces of the sleeves 9.

16 are disks secured within the sleeves 9 and abutting the inner faces of the heads 10, said disks having a plurality of holes 17 extending therethrough and leading to the radial recesses 14.

18 are rectangular slot openings extending through the heads 10 of the hydraulic sleeves arranged diametrically opposite and in central alinement.

19 are slot openings in the disks 16 registering with the slots 18 in the heads 10 and extending inward to points close to the center.

20 are rectangular shaped recesses formed in the outer faces of the disks 16 adjacent to the heads of greater width than the slots 19 and arranged parallel therewith.

21 are packing shuttles fitting within the recesses 20 and adapted to slide therein and closing the slots 18.

22 are heads closing the ends of the casing 1 and having the concentrically arranged journal bearings 23 in which the shaft 24 of the machine is journaled.

25 is the rotatable piston core rigidly secured upon the shaft 24 and supported within the cylinder chamber 4 in eccentric relation thereto. The cylinder chamber 4 is formed with an arc-shaped recess 26 at the bottom side, said recess having a radius corresponding to the radius of the periphery of the piston core 25 and the said core fits snugly into the said recess in a close running fit. The shaft 24 extends longitudinally through the machine passing through the centrally arranged circular openings in the hydraulic packing sleeve heads and the disks 16 and fitting tightly therein.

27 are radial slots formed in the piston core 25 extending longitudinally from end to end thereof.

28 are the piston vanes having the central portions 29 formed with parallel sides and adapted to fit with a sliding contact in the radial slots 27 in the piston core. The piston vanes extend longitudinally through the radial slots 19 and 18 in the disks 16 and packing sleeve heads 10, the portions 30 thereof being squared and fitted snugly in suitable openings through the packing shuttles 21, the ends of the central portions abutting said shuttles.

31 are traverse bearing portions formed on the piston vanes and 32 are the journal ends. The piston vanes 28 are bored longitudinally from end to end to receive the spindles 33 and said spindles project through the outer edge of the central portions 29 as shown particularly in Figs. 2 and 4.

34 are the piston packing shoes rigidly secured to the projecting central portions of the spindles 33, said shoes being formed of the same radius as the cylinder 4 and adapted to fit snugly against the inner wall of said cylinder. The ends of the shoes 34 are formed with laterally extending tongues 35 to provide a longer bearing at the ends and to carry the shoes well beyond the edges of the slots in the disks 16 so that they will not foul the edges of the said slots.

36 are ribs formed on the outer faces of the heads of the packing sleeves 9 arranged parallel to the radial slots 18.

37 are sets of roller bearings journaled in the cages 38 and arranged between the ribs 36 and the traverse bearing portions 31 of the piston vanes. Each alternate roller in the sets is formed with spur gear teeth 39 adapted to engage corresponding teeth 40 and 41 formed in the vanes 28 and ribs 36 respectively. This construction insures the proper travel of the roller bearings as the vanes move radially in and out.

42 and 43 are intercalated gyratory rings arranged at each end of the machine, the outer rings 42 being rotatably supported in the eccentric recesses 44 formed in casing heads 22 in concentric relation to the cylinder 4. In the form of machine illustrated two radial piston vanes are shown but it will be readily understood that any desired number may be used within the scope of the size of the machine.

In Fig. 4 I have shown a set of four gyratory piston supporting rings in order to illustrate clearly the manner of intercalating them, the description of this set applies to the pairs of rings shown in the other views. The outer rings 42 are formed L-shaped in cross section and are each provided with an inwardly extending lug member 45 formed with a cylindrical shaped socket portion 46 having a centrally arranged circular hole 47 in the end wall, said circular hole being adapted to receive the end of the shoe spindle 33. The rings are nested one within the other and are free to rotate independent of each other thus forming differential supports for the piston contact shoes. Each ring is provided with a lug member 45 extending inwardly and these are arranged an equal radial distance from the center. The flanges of the outer rings are cut away allowing the outer end walls of all the lugs to be in a common plane abutting the casing heads 22. When more than two rings are used in a set, I preferably form the inner ring with a central band portion 48 supported at intervals by radial ribs 49 and the lugs 45 are shaped to fit the outer periphery of said central band.

50 are bushings fitted on to the journal ends 32 of the piston vanes and journaled in the sockets 46 in the lug portions of the intercalated rings. The vane pistons are thus supported at the ends at a positive distance from the center of the cylinder 4 and as the spindles are rigidly secured in said rings the packing shoes 34 carried by said spindles are held in a positive position in continuous and uniform running contact with the wall of the said cylinder. The shoes are thus held from frictional contact with the cylinder due to centrifugal action. The piston supporting rings are preferably bored with numerous holes on the lug side as illustrated particularly in Fig. 5 to effect the balancing of the rings to render their action gyroscopic in rotation.

51 is an oil tube secured in the central portion 5 of the machine and having a central portion 52 extending into the oil chamber 3 and the discharge ends 53 arranged to coincide with the holes 17 in the end disks 16 as said disks rotate.

54 is a longitudinal recess formed in the bottom of the inner wall of the cylinder 4 communicating with the exhaust and adapted to receive any particles of solid matter which may get into the cylinder.

55 is a blow out passage in the top of the casing communicating with the annular recesses 8.

In the operation of this machine, the shaft 24 is rotated by any suitable power and as the piston core 25 is secured thereto it rotates within the eccentric cylinder chamber 4. The piston core 25 in rotation carries the piston vanes with it and as the said vanes are supported by the gyratory rings arranged concentric with the cylinder the said vanes slide in the radial slots in the core. The piston shoe spindles are rigidly secured in the supporting gyratory rings consequently the shoe and spindle must always be radial to and a constant radius from the operative and controlling center. The piston core is eccentric to the cylinder and as the slots in which the piston vanes operate are radial to the core, the said vanes are always radial to the core center but at variable radii and as the vanes are pendantly supported and swing upon the shoes the radials of the shoes and vanes diverge from the center of oscillation forming a rectilineal angle. The diagram shown in Fig. 6 illustrates this peculiar feature very clearly and as the said shoes are carried by the gyratory rings they are held in positive circumferential relationship and present a broad and uniform surface to the cylinder, consequently friction and wear are eliminated. The surfaces of the shoes and the cylinder are a close running fit and the lubricating oil forms a perfect packing. It will also be seen that the shoes do not follow the depression in the bottom of the cylinder chamber and consequently the running fit between the cylinder wall and piston core will not be impaired. This feature permits of the core being recessed in to the cylinder bed a considerable depth so that the oil packing will effect a perfect seal between the inlet and discharge. The rotation of the core and piston vanes effects the compression of the air or gas within the eccentric space between the core and cylinder wall, the compressed charge being discharged through the outlet port 7. The pressure of discharge enters the oil chamber 3 in the base and forces the oil contained therein through the tube 51 and as the holes 17 in the disks 16 pass the discharge ends of the said tube the oil is forced through the radial recess 14 in the packing sleeves 9. The combined pressure and centrifugal action fills the longitudinal recesses 70 in the inner wall of the packing sleeves and forms a floating support for same thereby minimizing friction. This arrangement of ports and passages forms an important factor in the balancing of the engine. The fluid lubricant is retained in the passages by centrifugal action and as compression occurs within the cylinder the pressure is exerted against the fluid and bears outwardly against the inner wall of the packing sleeve and balances the forces acting against the piston core thereby eliminating unequal pressure on the shaft bearings and reducing the wear to the minimum.

The arrangement of the fluid passages within the inner wall of the packing sleeves is very important as the fluid rotates with the sleeve and therefore eliminates any throttling effect and undue friction and heating of the fluid. Further, full advantage is thus taken of the outward thrust of the centrifugal forces. The arrangement of the recess 54 at the outlet port is also an important feature as any solids entering the cylinder will be precipitated into the oil chamber and be carried to the channels in the packing sleeves and retained there by the centrifugal forces. The blow out passage may be opened at any time and the luricant and all foreign matter will be forced out thus thoroughly cleansing the machine. In the modification shown in Fig. 8, I arrange the outlet port 56 below the point of intersection of the arc of the cylinder and the piston core so that the outlet is sealed by the core and I provide a port in the core in the form of a recess 57 which is of shorter length than the distance between the points 58 and 59. The gas or fluid being compressed is thus confined till the port 57 opens the exhaust and is again sealed as the port 57 passes the point 58.

Another very important feature in the present invention is in the use of a plurality of gyratory ring members to support the packing shoes rotating in the cylinder. Practically the entire weight of material of these rings is disposed outside of the point of support for the shoe and each ring is balanced so that in rotation no centrifugal forces are set up. Further, the body of the metal of the rings and their peripheral weight gyrate, causing a center of percussion to be set up which has a tendency to overcome the otherwise resultant vibrations of the piston while traveling at variable velocities due to the change in position of the said piston vanes in relation to the axis of the cylinder and any slight percussion due to the shifting of the center of gravity or center of percussion of the vanes is almost entirely absorbed within the rings and the transference of vibration to the other parts of the machine is practically eliminated.

A machine constructed as described will operate with the minimum of friction, will be perfectly sealed at all points eliminating leakage, will be perfectly balanced and will operate with the maximum efficiency and may be used equally well as a compressor, vacuum pump or power unit.

What I claim as my invention is:—

1. In a rotary compressor, a cylinder, a piston core rotatably supported eccentrically within said cylinder and having radial slots extending longitudinally thereof, shoe members arc-shaped in cross section engaging the inner wall of said cylinder, means for supporting said shoe members in fixed relation to the axis of said cylinder, and piston vanes pendantly hinged to said shoe members and extending into the radial slots in said piston core.

2. In a rotary compressor, a cylinder, a piston core rotatably supported eccentrically within said cylinder, rotary members arranged concentric with said cylinder, shoe members rigidly supported from said rotary concentric members and adapted to engage in running contact with the inner wall of said cylinder, and piston vanes pivotally connected to said shoe members and slidably engaging the said piston core.

3. In a rotary compressor, a cylinder, a piston core rotatably supported eccentrically within said cylinder and having radial slots, rotary members concentrically journaled at the ends of said cylinder, shoe members arranged in running contact with the surface of said cylinder and rigidly connected to pairs of said rotary members, said shoes being independently rotatable within the cylinder, and piston vanes pivotally connected to said shoes and extending into and sliding in the radial slots in said piston core.

4. In a rotary compressor, a cylinder, a piston core rotatably supported eccentrically within said cylinder, rotary members arranged concentric with said cylinder, spindles extending through said cylinder and each fixedly secured at the ends in independently rotatable pairs of said rotary members, shoe members of arc-shaped cross section rigid with said spindles and engaging the inner wall of said cylinder in a running contact, and piston vanes having end portions encircling the said spindles and the central portions within the cylinder partly encircling said spindles, said piston vanes swinging freely on said spindles and extending into the radial slots in said piston core.

5. In a rotary compressor, a cylinder, a piston core rotatably supported eccentrically within said cylinder, rotary members arranged concentric with said cylinder, piston vanes slidably arranged in radial arrangement in said piston core, said vanes being bored longitudinally from end to end the bored hole cutting through the outer edge of the central portion, spindles extending through and rotatable in the bored holes in said vanes and secured at the ends in independently rotatable pairs of said rotary members in fixed relation to the axis of the cylinder, and arc-shaped shoe members secured to the central portions of said spindles projecting beyond the outer edge of the central portion of said vanes, said shoe members engaging the inner wall of the cylinder in running contact and having end portions of greater width than the shoes.

6. In a rotary compressor, a cylinder having a longitudinal recess of arc-shaped cross section formed in its inner wall, a piston core of lesser diameter than said cylinder journaled eccentrically therein and fitting into said longitudinal recess in close running contact, said core having radial longitudinal slots therein, shoe members engaging the inner wall of the cylinder, rotatable means for supporting said shoe members in fixed relation to the axis of the cylinder, and piston vanes pivotally connected to said shoe members and sliding in the radial slots in said piston core.

7. In a rotary compressor, a cylinder, a piston core rotatably supported eccentrically within said cylinder and having radial slots extending longitudinally thereof, a plurality of inter-nested annular gyratory rings, balanced independently of each other rotatably supported from their outer sides concentric with said cylinder at each end thereof, shoe members engaging the inner wall of the cylinder and each secured at the ends to an independently rotatable pair of said gyratory rings and in fixed relation to the axis of the cylinder, and piston vanes pivotally connected to said shoes and sliding in the radial slots in said piston core.

8. In a rotary compressor, a cylinder, a piston core rotatably supported eccentrically within said cylinder and having radial slots extending longitudinally thereof, a plurality of ring members arranged in sets at each end of said cylinder rotatably supported from their outer walls and concentric therewith, each individual ring having a lug projection formed with a journal bearing therein, said lugs having their axes all arranged equidistant from the cylinder axis and in the same transverse plane, piston vanes having journal ends rotatably supported in the bearings in corresponding pairs of said rings and having their central portions slidable in the radial slots in said piston core, spindles extending longitudinally through said piston vanes on the axis of their rotary support in said rings, said spindles being fixed in said rings and projecting partially through the outer edge of the central portion of said vanes, and shoe members fixed to the central portions of said spindles projecting beyond said piston vanes and engaging the inner wall of said cylinder in running contact.

9. In a rotary compressor, a cylinder, a piston core rotatably supported eccentrically within said cylinder and having radial slots extending longitudinally thereof, a plurality of ring members arranged in sets at each end of said cylinder rotatably supported from their outer walls and concentric therewith, each individual ring having an inwardly projecting radial lug formed with a journal bearing therein, said rings being inter-nested and having the lugs arranged in the same transverse plane and their axes equidistant from the axis of the cylinder, said rings being cut away adjacent to the lugs and balanced, piston vanes having journal ends rotatably supported in the bearings in corresponding pairs of said rings and having their central portions slidable in the radial slots in said piston core, spindles extending longitudinally through said piston vanes on the axis of their rotary support in said rings, said spindles being fixed in said rings and projecting partially through the outer edge of the central portion of said vanes, and shoe members fixed to the central portions of said spindles projecting beyond said piston vanes and engaging the inner wall of said cylinder in running contact.

10. In a rotary compressor, a cylinder, a piston core journaled eccentrically within said cylinder, piston vanes operatively connected with said piston core within said cylinder, a pair of sleeve members encircling said cylinder and having heads closing the ends thereof, said sleeve members being rotatably connected with said piston core and arranged concentric therewith and having a plurality of recesses formed in the inner walls, said recesses having communicating with the cylinder and forming hydraulic chambers adapted to retain through the centrifugal action of the rotating sleeves a hydraulic packing subject to the varying pressures within the cylinder and counterbalancing the lateral pressure against the piston core.

11. In a rotary compressor, a casing formed with an eccentrically arranged cylinder therein and annular recesses surrounding the outer ends of the cylinder portion, heads closing the ends of said casing and having journal bearings therein concentric with said annular recesses and eccentric to said cylinder, a shaft journaled in said heads and extending through said cylinder, a piston core secured to said shaft and rotating eccentrically within said cylinder, piston vanes operatively connected with said piston core and operating in said cylinder, a pair of sleeve members closed at the ends and extending into the concentric annular grooves eccentrically surrounding the ends of the cylinder and formed with heads closing the ends of said cylinder and fixedly secured on said shaft, said sleeves having a plurality of radial recesses formed in the inner wall of the heads thereof and communicating with the plurality of longitudinally arranged hydraulic chambers formed in the inner peripheral faces of said sleeves, and disk members fitting within said sleeves and abutting the radial grooved faces and having a circular row of holes leading therethrough and communicating with the radial recesses in the heads of said sleeves, said radial recesses and hydraulic chambers being adapted to contain and retain by centrifugal action a packing fluid, the holes in said disks communicating with the interior of the cylinder and conveying the pressure within said cylinder to the packing fluid and exerting an outward pressure against a portion of the sleeves to counterbalance the lateral pressure against the piston core.

12. In a rotary compressor, a casing formed with an eccentrically arranged cylinder therein and annular recesses surrounding the outer ends of the cylinder portion, heads closing the ends of said casing and having journal bearings therein concentric with said annular grooves and eccentric to said cylinder, a shaft journaled in said heads and extending through said cylinder, a piston core secured to said shaft and rotating eccentrically within said cylinder, piston vanes operatively connected with said piston core and operating in said cylinder, a pair of sleeve members closed at the ends and extending into the concentric annular grooves eccentrically surrounding the ends of the cylinder and formed with heads closing the ends of said cylinder and fixedly secured on said shaft, said sleeves having radial openings therethrough arranged in diametric pairs, disk members secured within said sleeves and abutting the inner walls of the heads thereof, said disks having radial openings therethrough registering with the openings in said heads and rectangular shaped recesses of greater width than the slots formed in the faces abutting the heads of said sleeves, and shuttle plates slidably arranged within said rectangular shaped recesses in said disks and having openings therethrough through which the reduced end portions of the piston vanes extend, the ends of the central portions of said piston vanes extending through the slots in said disks and abutting said shuttle plates, said plates retaining the slotted openings in the head ends of the sleeves closed.

13. In a rotary compressor, a casing having an eccentrically arranged cylinder therein, hydraulic packing sleeves arranged concentric in said casing and eccentric to said cylinder and having radial transverse slots through the head ends thereof, packing shuttles slidably arranged and closing said slots, a shaft suitably journaled in the casing and extending eccentrically through said cylinder and rotatably carrying said hydraulic packing sleeves, a cylindrical piston core secured to and rotating with said shaft eccentrically within said cylinder and having radial longitudinal slots therein, piston vanes formed with parallel side faces slidably arranged in the slots in said piston core and having the ends of the central portions abutting said packing shuttle and having reduced ends extending through said shuttles and enlarged outer ends formed with parallel side faces extending beyond the outer faces of the heads of said hydraulic packing sleeves, web members projecting from the outer face of the head ends of said packing sleeves in parallel relation to the radial slots therethrough and forming traverse bearing guides for said piston vanes, and roller bearings arranged between said traverse piston vane guides and the enlarged ends of said piston vanes.

14. In a rotary compressor, a casing having an eccentrically arranged cylinder therein, hydraulic packing sleeves arranged concentric in said casing and eccentric to said cylinder and having radial transverse slots through the heads thereof, packing shuttles slidably arranged and closing said slots, a shaft suitably journaled in the casing and extending eccentrically through said cylinder and rotatably carrying said hydraulic packing sleeves, a cylindrical piston core secured to and rotating with said shaft eccentrically within said cylinder and having radial longitudinal slots therein, piston vanes formed with parallel side faces slidably arranged in the slots in said piston core and having the ends of the central portions abutting said packing shuttle and having the reduced ends extending through said shuttles and enlarged opter portions formed with parallel side faces extending beyond the outer faces of the heads of said hydraulic packing sleeves, web members projecting from the outer face of the head ends of said packing sleeves in parallel relation to the radial slots therethrough and forming traverse bearing guides for said piston vanes, said web members having spur teeth formed in the inner faces thereof in the form of a rack, and suitably caged roller bearings arranged between said web members and the enlarged ends of said piston vanes, said rollers having centrally arranged projecting spur teeth adapted to engage the rack teeth formed in said webs and corresponding rack teeth formed in the adjacent faces of the enlarged ends of said piston vanes.

15. In a rotary compressor, a casing supported on a hollow base having a central portion formed with an eccentrically arranged longitudinal cylinder therein and inlet and outlet ports leading through said casing to said cylinder, the outlet port communicting with the interior of the hollow base, a shaft journaled in suitable bearings in the ends of said casing and extending eccentrically through said cylinder, a piston core secured on said shaft and rotating eccentrically within said cylinder, piston vanes operating in said core, hydraulic packing sleeves closing the ends of said cylinder and rigidly connected with said shaft and having hydraulic recesses in the inner peripheral walls and communicating passages opening into the cylinder, an oil tube secured in the central portion of the casing and having discharge ends adapted to communicate with the passages in said hydraulic sleeves, said oil tube having a downward extension leading into the oil chamber formed by the hollow base and forming an oil duct conveying oil under pressure to the hydraulic packing sleeves in rotation.

16. In a rotary compressor, a casing supported on a hollow base and having a central portion formed with an eccentrically arranged longitudinal cylinder therein and inlet and outlet ports leading through said casing to said cylinder, the outlet port communicating with the interior of the hollow base, said cylinder also having a longitudinally arranged recess formed therein and communicating with the outlet port adapted to intercept and convey any solids finding ingress to the cylinder, a shaft journaled in said casing, a piston core secured to said shaft arranged eccentrically within said cylinder, piston vanes operating in said core, hydraulic packing sleeves closing the ends of said cylinder, means for conveying lubricating fluid from the hollow base to the rotating packing sleeves and a blow-out passage in said casing adapted to convey the lubricating fluid from said hydraulic packing sleeves.

17. In a rotary compressor, a cylinder having a longitudinal recess of arc-shaped cross section formed in its inner wall and an outlet port leading from said arc-shaped recess, a piston core of lesser diameter than said cylinder journaled eccentrically therein and fitting into said longitudinal recess in a close running contact, said core having a recessed port in its periphery adapted to register with the outlet port to allow the escape of the compressed fluid.

18. In a rotary compressor, a cylinder, a piston core journaled eccentrically within said cylinder, piston vanes operatively connected with said piston core within said cylinder, a pair of sleeve members encircling said cylinder and having heads closing the ends thereof, said sleeve members being rotatably connected with said piston core and arranged concentric therewith and having slots through the heads thereof through which the ends of said piston vanes extend, and shuttle plates secured to the projecting ends of said vanes and closing the slots in said sleeves.

19. In a rotary compressor, a casing formed with an eccentrically arranged cylinder therein and annular recesses surrounding the outer ends of the cylinder portion, heads closing the ends of said casing and having journaled bearings therein concentric with said annular grooves and eccentric to said cylinder, a shaft journaled in said heads and extending through said cylinder, a piston core secured to said shaft and rotating eccentrically within said cylinder, piston vanes operatively connected with said piston core and operating in said cylinder, and a pair of sleeve members closed at the ends and extending into the concentric annular grooves eccentrically surrounding the ends of the cylinder and formed with heads closing the ends of said cylinder and fixedly secured on said shaft, said sleeves having spiral grooves formed in the outer periphery forming oil channels.

20. In a rotary compressor, a cylinder, a piston core eccentrically mounted in said piston, a plurality of shoe members engaging the inner walls of said cylinder, piston vanes pendantly supported from said shoes and extending radially into said piston core, and a plurality of inter-nested ring members rotatably supported from their outer sides and adapted to rotate independent of each other and each having an inwardly projecting radial lug adapted to support the ends of said shoe members in differential relation the one to the other, the inner of said ring members having a secondary ring supported by a plurality of inwardly extending radial arms.

21. In a rotary compressor, a cylinder, a piston core eccentrically mounted in said piston, a plurality of shoe members engaging the inner walls of said cylinder, piston vanes pendantly supported from said shoes and extending radially into said piston core, and a plurality of inter-nested ring members rotatably supported from their outer sides and adapted to rotate independent of each other and each having an inwardly projecting radial lug adapted to support the ends of said shoe members in differential relation the one to the other, the inner of said ring members having a secondary ring supported by a plurality of inwardly extending radial arms, said lugs having arc-shaped flange portions formed on their inner sides adapted to engage the outer peripheral face of the secondary ring of the inner ring member.

22. In a rotary compressor, a cylinder, a piston core eccentrically mounted in said piston, a plurality of shoe members engaging the inner walls of said cylinder, piston vanes pendantly supported from said shoes and extending radially into said piston core, and a plurality of inter-nested ring members rotatably supported from their outer sides and adapted to rotate independent of each other and each having an inwardly projecting radial lug adapted to support the ends of said shoe members in differential relation the one to the other, said rings being cut away on the sides adjacent to the lugs to balance their peripheral weight.

23. In a rotary compressor, a cylinder, a piston core journaled eccentrically within said cylinder, piston vanes operatively connected with said piston core within said cylinder, a pair of sleeve members encircling and closing the ends of said cylinder and having circular heads formed integral therewith and of slightly larger diameter than the outer periphery of the sleeves, the inner faces of the projecting portions abutting the end faces of the cylinder, said sleeve members being rotatably connected with said piston core and arranged concentric therewith.

Signed at the city of Toronto, county of York, Province of Ontario, in the Dominion of Canada, this 8th day of October 1912.

WILLIAM SHORE.

Witnesses:
H. L. TRIMBLE,
E. HERON.